(12) United States Patent
Caronni et al.

(10) Patent No.: US 7,814,228 B2
(45) Date of Patent: Oct. 12, 2010

(54) SYSTEM AND METHOD FOR USING DATA ENCAPSULATION IN A VIRTUAL NETWORK

(75) Inventors: Germano Caronni, Mountain View, CA (US); Robert P. St. Pierre, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1658 days.

(21) Appl. No.: 10/367,553

(22) Filed: Feb. 13, 2003

(65) Prior Publication Data

US 2004/0162915 A1 Aug. 19, 2004

(51) Int. Cl.
*G06F 15/16* (2006.01)
(52) U.S. Cl. ...................................................... 709/245
(58) Field of Classification Search ................. 709/245; 370/352, 249, 392
See application file for complete search history.

(56) References Cited

U.S. PATENT DOCUMENTS

| | | | | |
|---|---|---|---|---|
| 6,028,848 | A * | 2/2000 | Bhatia et al. ................ | 370/257 |
| 6,772,226 | B1 * | 8/2004 | Bommareddy et al. ...... | 709/245 |
| 2002/0138628 | A1 * | 9/2002 | Tingley et al. .............. | 709/227 |
| 2002/0150083 | A1 * | 10/2002 | Fangman et al. ............ | 370/352 |
| 2004/0010618 | A1 * | 1/2004 | Thomas ...................... | 709/245 |
| 2004/0044778 | A1 * | 3/2004 | Alkhatib et al. ............. | 709/245 |
| 2004/0162914 | A1 * | 8/2004 | St. Pierre et al. ........... | 709/245 |
| 2006/0023676 | A1 * | 2/2006 | Whitmore et al. ........... | 370/338 |

* cited by examiner

*Primary Examiner*—Hassan Phillips
(74) *Attorney, Agent, or Firm*—Marsh Fischmann & Breyfogle LLP

(57) ABSTRACT

A method of extending the functionality of a virtual network is disclosed. Messages intended for a virtual destination address located on a network equipped with a device performing packet filtering, network address translation or a similar function on the edge of the network (an "edge device"), are encapsulated in higher level protocols prior to being sent to the edge device. The virtual destination address may be associated with a process on the edge device or a process on another device in the interior of the network. Higher level protocol designations, including transport protocol designations accompanied by a port number and application protocol designations, are retrieved from an extended virtual address registration. Messages arriving at the edge device are determined by the Network layer to contain a higher level protocol and are passed up the Internet Protocol model stack to a higher layer. The higher layers of the edge device, such as the Transport layer and the Application layer, may be accessible and therefore configurable to a non-Systems Administrator thus allowing the message to reach the intended virtual destination address.

16 Claims, 5 Drawing Sheets

Figure 2

Virtual Address Resolution Lookup Table 26

Destination Address 78          Associations 79

80 — Virtual   10.0.0.12 — 90
- 91 — Real: 152.70.0.1
- 92 — Transport: UDP
- 93 — Port: 6789
- 94 — Application: None 82 — Virtual   10.0.0.13
- Real: 152.70.0.1
- Transport: TCP
- Port: 6790
- Application: SSL 84 — Virtual   10.0.0.14
- Real: 152.70.0.1
- Transport: UDP
- Port: 6789
- Application: None 86 — Virtual   10.0.0.15
- Real: 152.70.0.1
- Transport: UDP
- Port: 80
- Application: HTTP 88 — Virtual   10.0.0.16
- Real: 152.70.0.1
- Transport: TCP
- Port: 25
- Application: SMTP

SYSTEM AND METHOD FOR USING DATA ENCAPSULATION IN A VIRTUAL NETWORK

FIELD OF THE INVENTION

The illustrative embodiment of the present invention relates generally to a virtual computer network and more particularly to the addressing of messages sent in a virtual network using data encapsulated in higher level protocols.

BACKGROUND

A virtual network is a logical network overlaid on a physical network. A virtual network allows a virtual IP (Internet Protocol) address to be assigned to individual processes or applications running on a computer or other electronic device. The use of a virtual network allows for an extension of the computer's physical resources since a virtual network's components are not restricted to a one-to-one relationship with the physical devices in that computer system and network. Messages may be sent to a process at a virtual IP address separate from the real IP address used by the network device upon which the process is executed.

When a process executing on a virtual network needs to send a message to a virtual destination address, the virtual destination address must first be resolved into a real IP address. Virtual addresses in a virtual network are registered and associated with a real IP address. The resolution process determines the real IP address associated with a particular destination address. The message is then sent to the real IP address. The real IP address is resolved into a Link layer MAC address of the network interface on the receiving physical device (such as the address of a network interface card (NIC)). The message is then passed up to the Network layer and then onto the Application layer and the destination address associated with a process or application.

The concept of virtual IP addresses may be illustrated by reference to one of the protocol stack models such as the OSI (Open System Interconnection) model and the Internet Protocol model which describe a networking framework in functional terms. The OSI model contains seven layers, Physical layer, Link layer, Network layer, Transport layer, Session layer, Presentation layer, and Application layer. The Internet Protocol model contains five layers, Physical layer, Link layer, Network layer, Transport layer and Application layer (by absorbing the functionality of the Session and Presentation layers into other layers). Although the OSI model is also relevant to the present invention, examples contained herein will be made with reference to the five layer Internet Protocol stack. The Physical layer is the medium used to transport data such as wires carrying electricity, or fiber optic cable transporting light signals. The Link layer is the address of the network interface such as a MAC address. The Network layer holds IP addresses used to route messages from one network to another. Transport protocols such as UDP and TCP run at the Transport layer and are described further below. Applications and processes run at the Application layer. Protocols above the Network layer are referred to as "higher level protocols" herein (i.e.: transport protocols).

Unfortunately, when the virtual destination address is located on a physical device on the interior of a network which is running a proxy server, firewall, or other packet filtering mechanism, messages that have been sent to a virtual destination address have difficulty getting all the way to their target. The term "interior of a network" refers to devices which are not able to directly access another network without first going through another device on their own network. For example, most local area networks (LANs) access the Internet through a proxy server. Devices other than the proxy server are said to be on the interior of the LAN. The proxy server is referred to as an "edge device" because it is able to directly contact another network without using an intermediary device. "Packet filtering" refers to the filtering of incoming messages or packets by an edge device or process on an edge device so that not all of the packets are permitted to proceed to their destination, they are "filtered out". If the electronic device that is filtering incoming packets, is under the control of the party executing the process associated with the virtual destination address, the device may be configured to allow the packets through to the end destination. However, in many situations, the edge device is not configurable by anyone without system administration privileges. Similarly, if the edge device is a device performing Network Address Translation (a "NAT box"), the NAT box rewrites all outgoing packets from an end user in the interior of the network to make them look like they came directly from the NAT box, and remembers that any traffic coming back from the particular destination address must be mapped back to the originating internal device. Consequently, the responding devices think they are responding to the sending device when they are actually responding to an edge device. In such a case, the packets intended for the virtual destination address on the interior of the physical network may be dropped and not reach their intended destination.

SUMMARY OF THE INVENTION

The illustrative embodiment of the present invention provides a method of extending the functionality of a virtual network. Messages intended for a virtual destination address located on a network equipped with a device performing packet filtering, network address translation or a similar function on the edge of the network (an "edge device"), are encapsulated in higher level protocols prior to being sent to the edge device. The virtual destination address may be associated with a process on the edge device or a process on another device in the interior of the network. Higher level protocol designations, including transport protocol designations accompanied by a port number and application protocol designations, are retrieved from an extended virtual address registration. Messages arriving at the edge device are determined by the Network layer to contain a higher level protocol and are passed up the Internet Protocol model stack to a higher layer. The higher layers of the edge device, such as the Transport layer and the Application layer, may be accessible and therefore configurable to a non-Systems Administrator thus allowing the message to reach the intended virtual destination address.

In one embodiment, a virtual network supported by a physical network includes a virtual address resolution facility. The virtual address resolution facility is used to resolve a virtual IP address into a real IP address. A virtual address is registered with the virtual address resolution facility and the registration includes a real IP address, a port number and a transport protocol designation associated with a virtual address. The virtual address destination is resolved using the virtual address resolution facility and a message is sent from a virtual address in the virtual network to the real IP address indicated in the virtual address destination registration. In one aspect of the embodiment, the registration also includes an Application layer protocol designation.

In another embodiment, a virtual network supported by a physical network includes a virtual address resolution facility. The virtual address resolution facility is used to resolve a virtual IP address into a real IP address. The virtual address destination is resolved using a real IP address, a port number and a transport protocol designation associated with the virtual address destination that are held by the virtual address resolution facility. A message is sent from a virtual address in the virtual network to the real IP address associated with the virtual address destination. In one aspect of the embodiment of the present invention, the virtual address resolution facility also holds an Application layer protocol designation that is associated with the virtual address destination.

In an embodiment of the present invention a virtual network is supported by a physical network and includes a virtual address resolution facility. The virtual address resolution facility is used to resolve a virtual IP address into a real IP address. A registration request is received at the virtual address resolution facility which includes a real IP address, a port address, a transport protocol designation and an Application layer protocol designation associated with a virtual address destination. The associations are stored using the virtual address resolution facility. A resolution request is received referencing a virtual address destination and the resolution request is resolved using the virtual address resolution facility and the stored associations.

BRIEF DESCRIPTION OF THE DRAWINGS

FIG. 2 is a block diagram of the extended virtual address resolution lookup table utilized by the illustrative embodiment of the present invention;

DETAILED DESCRIPTION

The illustrative embodiment of the present invention provides a method of encapsulating messages sent to a virtual destination address in higher level protocols. The higher level protocols are specified in a virtual address registration for the destination virtual address that is stored in a lookup table for the virtual network. The encapsulation of the messages in the specified higher level protocol enables the messages to reach their intended destination despite the presence of packet filtering devices on the edge of a network. The encapsulated message may also make use of compression, encryption, authentication of data and similar measures to further modify the message.

Figure 1:
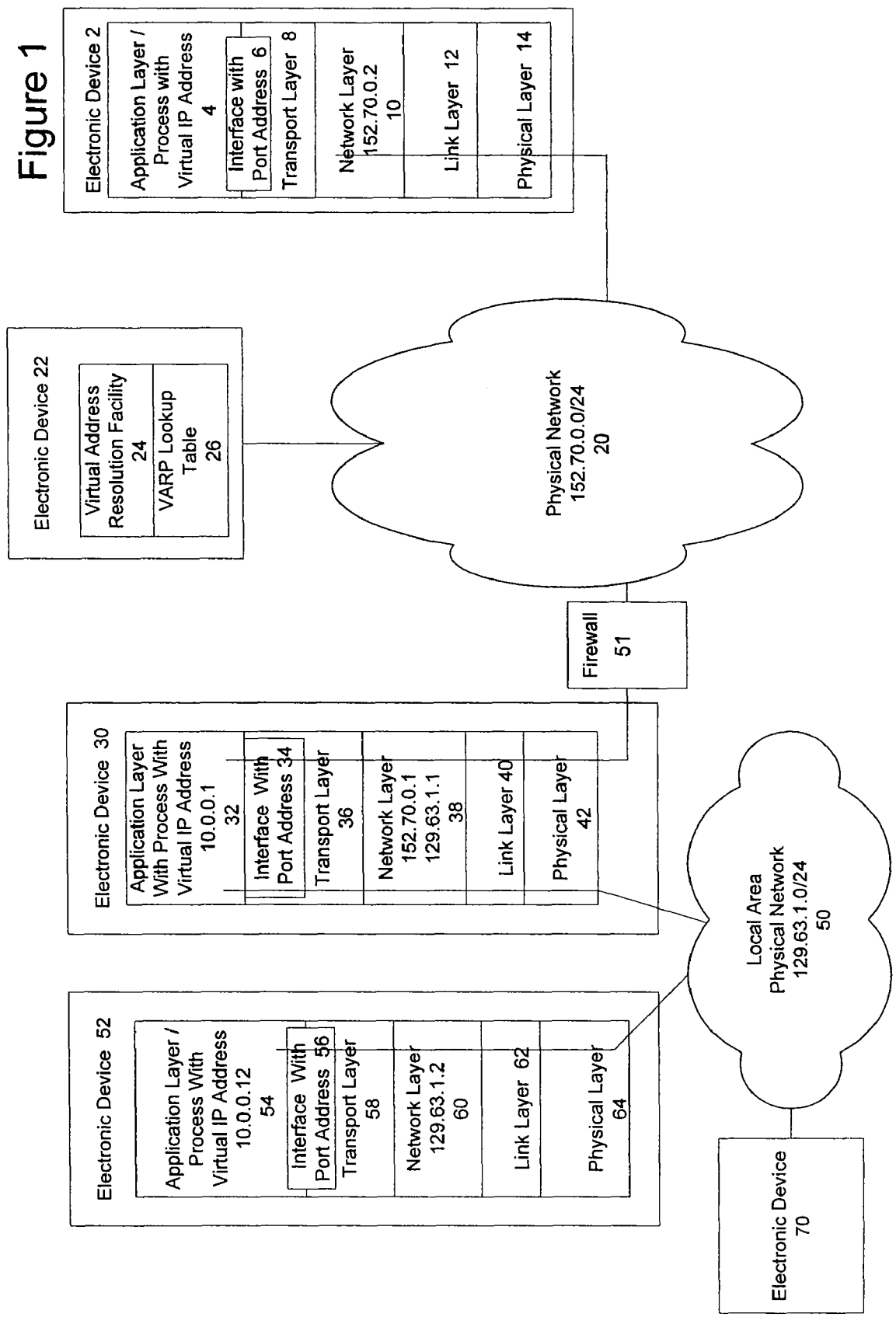
FIG. 1 depicts an environment suitable for practicing the illustrative embodiment of the present invention.

FIG. 1 depicts an environment suitable for practicing the illustrative embodiment of the present invention. An electronic device 2 is part of a physical network 20. The devices on the physical network 20 are addressed using IP addresses in the 152.70.0.0/24 range. The electronic device 2 includes the five layers of the Internet protocol stack, the application layer 4 which has a process associated with a virtual IP address, a Transport layer 8, a Network layer 10, a Link layer 12 and a Physical layer 14. The Application layer process communicates with the Transport layer through an interface with a port address 6. Also part of the physical network 20 is an electronic device 22 holding a virtual address resolution facility 24. The virtual address resolution facility is software used to register, store and resolve virtual address information for processes and applications executing on the virtual network. The virtual address resolution facility 24 works with stored virtual address registrations for the virtual network. The registered addresses are stored in an searchable and accessible location on the network, such as by storing them in a Virtual Address Resolution Protocol (VARP) lookup table 26. The registrations are used to resolve the virtual address into the real IP address of a physical device to which messages may be sent.

The physical network 20 is also interfaced with an electronic device 30 located at the edge of a local area physical network 50 which includes devices addressable using IP addresses in the 129.63.1.0/24 range. The electronic device 30 may be a proxy server, gateway, NAT box, or other device and may perform packet filtering. Alternatively, a firewall 51 may be executed in either a hardware or software form to filter packets sent to the local area physical network 50 from the physical network 20. The firewall 51 may be located outside the electronic device 30 or alternatively may be running in software form on the electronic device 30. Those skilled in the art will recognize that a number of different types of networks may be utilized within the scope of the present invention. The networks may be the Internet, an intranet, wide area network (WAN), a local area network (LAN), a satellite network, a wireless network, or some other type of network capable of supporting a virtual network through the devices thereon.

The electronic device 30 also includes the Internet protocol stack with an Application layer 32, a Transport layer 36, a Network layer 38 a Link layer 40, and a Physical layer 42. The Application layer includes a process associated with the virtual IP address of 10.0.0.1. Processes or applications on the Application layer and the Transport layer are connected by an interface with a port address 34. An additional electronic device 52 is also interfaced with the local area physical network 50. The electronic device 52 includes an Application layer executing a process with an associated virtual IP address 10.0.0.12 (54) which may be the intended destination address for messages sent from the process executing in the virtual network located on the electronic device 2. The other layers of the Internet protocol stack are also present on the electronic device 52 including a Transport layer 58, a Network layer 60, a Link layer 62, and a Physical layer 64. The Application layer processes or applications and the Transport layer are connected by an interface with a port address 56. Additional electronic devices such as electronic device 70 may also be interfaced with the local area physical network 50.

The process running on the electronic device 52 registers its virtual address with the virtual address resolution facility 24. The registration includes an associated real IP address for a physical device to which messages may be sent that are intended for the virtual address. In those cases where the virtual network process is not located on the edge device, the real IP address is not on the same device upon which the virtual network process is executing, but rather is on the edge device. The extended virtual registration also includes a designation of a transport protocol and a port address for an interface between the Application layer and the Transport layer. An Application layer protocol may also be designated. The port address is utilized to enable delivery from the Transport layer up to an application or process executing on the Application layer. The additional protocol layer designations indicate to a sending process that it should encapsulate the message or data in the higher level protocol to enable the delivery of the message to the proper destination. The electronic devices 2, 22, 30, 52 and 70 may be a number of different types of devices with network connectivity such as desktop computers, laptop computers, servers, hand held PDA's, network appliances, and other devices capable of implementing the five layer Internet protocol stack.

FIG. 2 depicts a block diagram of the VARP lookup table 26 used by the virtual address resolution facility 24. The VARP lookup table 26 may be stored at any location accessible over the network. The VARP lookup table 26 includes registered virtual destination addresses located in a column 78 and corresponding associations located in a column 79. Entries 80, 82, 84, 86 and 88 include the registered virtual destination address and information associated with the registered virtual destination address. Each entry in the VARP lookup table 26 will list the registering virtual IP address 90 and associated information including a real IP address 91, a transport protocol designation 92, a port number identification 93 and an Application layer protocol designation 94. The associations are provided at the time the virtual destination address is registered in the virtual network. For example, the entry 80 for the virtual IP address 10.0.0.12 (90) includes the association of a real IP address 152.70.0.1 (91), an associated Transport layer protocol designation, UDP 92, an associated port number, 6789 (93), and an Application layer protocol designation of 'none' 94.

In the entry 80, the registered virtual IP address 10.0.0.12 (90) is associated with a process running on an electronic device 52 located at the interior of the local area physical network 50. However, the electronic device 30 sitting at the edge of the local area physical network 50 with a real IP address of 152.70.0.1 (91) is associated with the process in the registration entry 80. Messages sent to the virtual destination are resolved using the associated real IP address of the edge device 30. A standard Address Resolution Protocol (ARP) lookup is performed to resolve the Real IP address of the edge electronic device 30 into a 6 byte Link layer MAC address. Upon receipt of the incoming message, the Link layer 40 of the edge device 30 passes the incoming message to the Network layer 38. The registration entry 80 also includes a Transport layer designation 92 indicating that the data should be encapsulated in the UDP transport protocol prior to being sent. The UDP transport protocol provides for a connectionless service with the packets arriving without a guarantee of the sequence arriving in order. Encapsulated packets at the Network layer 38 which are found to contain UDP messages are sent to the Transport layer for further processing. The port designation number (93) is used at the Transport layer to direct the incoming message to the process running on the Application layer above through the appropriate interface. The designation of port number 6789 uniquely identifies the interface 34 between a particular process or application running on the Application layer 32 and the Transport layer 36. The process or application at the Application layer associated with port number 6789 may be used to redirect messages from the Application layer on the electronic device 30 to virtual addresses in the interior of the network. The process at port number 6789 may be configured so that it automatically redirects messages intended for virtual addresses associated with processes executing on other devices on the network. The redirection entails sending the messages back down the protocol stack out onto the physical network and out to the proper destination. The entry 80 does not specify a particular application data format to which the incoming data must comply. Where no data format is specified, the incoming message may appear as an IP packet for the virtual network (e.g. IP header, TCP header, payload) or like an IPSEC encapsulated packet or similar arrangement.

Other transport protocols and well known ports may also be used. The entry 82 for virtual destination address 10.0.0.13 designates TCP (Transmission Control Protocol) for a transport protocol along with port number 6790 to pass a message formatted for SSL (Secure Socket Layers). TCP is a connection oriented service which guarantees delivery of packets in the original sending order. The use of TCP requires an initial "handshake" between the sending and receiving processes prior to sending the actual message. Messages sent to the 10.0.0.13 virtual destination address are designated to use port 6790 which is the address of the interface between the SSL application on the Application layer and the Transport layer. Entry 84 in the VARP lookup table 26 for the virtual destination address of 10.0.0.14 indicates the same entries as for the registration for the virtual destination address of 10.0.0.12. The process running on the Application layer at port 6789 will handle messages intended for both virtual destinations. Entry 86 for the virtual destination address of 10.0.0.15 indicates that the data in the message being sent should be formatted in HTTP (Hyper Text Transfer Protocol) using UDP for a transport protocol and using well-known port 80 as the interface to the Application layer. Similarly, the entry 88 in the VARP lookup table 26 for the virtual destination address of 10.0.0.16 designates the used of the TCP transport protocol using well-known port 25 to forward data formatted for use with SMTP (Simple Mail Transfer Protocol).

Figure 3:
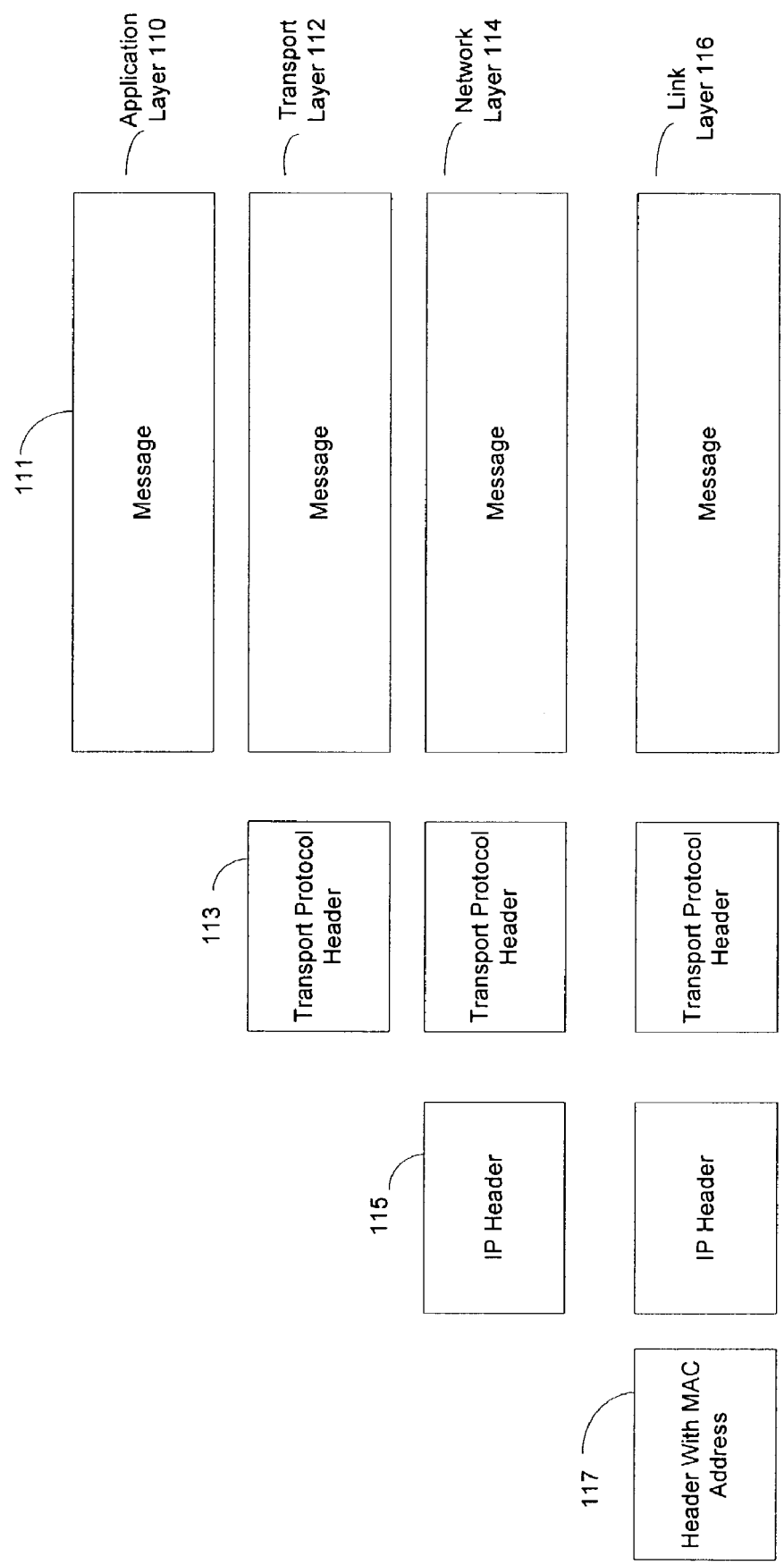
FIG. 3 is a block diagram of the encapsulation of a message intended for a virtual destination address utilizing the registered higher level protocols specified in a Virtual Address Resolution Protocol lookup table.

The illustrative embodiment of the present invention attempts to circumvent problems caused by packet filtering and network address translation occurring at the edge of networks through the use of higher layer protocols. FIG. 3 depicts a block diagram of the encapsulation process used to send a message from a virtual IP address to another virtual IP address located at the interior of a network at which packet filtering and/or network address translation is occurring. The virtual address resolution facility 24 is used to determine the associations registered with the destination address. The original message 111 at the Application layer 110 is formatted in a format specified in the registration of the virtual destination address if one is so indicated (e.g. HTTP). The message 111 is passed down to the Transport layer 112. The Transport layer 112 takes the original message 111 and adds a transport protocol header 113 as specified in the virtual address destination registration. The transport protocol header 113 may be a UDP header, TCP header, an X.25 header, XTP header, AppleTalk header, or other similar transport protocol header. Those skilled in the art will realize that the message may include an IPSEC header, inner IP header, UDP or TCP header and inner payload.

The message 111 and the transport protocol header 113 are then passed down from the Transport layer 112 to the Network layer 114. At the Network layer 114, the resolved real IP address which has been retrieved from the VARP lookup table 26 is added to the transport protocol header 113 and the original message 111. Following the addition of the IP header 115, the Network layer 114 passes the IP header transport protocol header 113 and message 111 down to the Link layer 116. The Link layer 116 resolves the real IP address retrieved from the VARP lookup with an ARP lookup to determine the MAC address of the destination device. A header with the MAC address is appended to the IP header 115, Transport Protocol header 113 and the original message. The Link layer 116 then passes the entire packet including headers to the Physical layer for transmission to the destination. The Physical Layer may use any of numerous methods to transmit the data including the use of fiber-optic cable, Ethernet cable, telephone wire, satellite relays, wireless transmissions, and other mechanisms. Upon receipt at the destination device, the process is reversed with the message traveling up the Internet Protocol stack from the Link layer to the Network layer. It is at the Network layer 114 where the message is passed up to the Transport layer 112 rather than being discarded. At the Transport layer 112, the port number designation from the virtual address registration is utilized to pass the message to a particular port leading to a process at the Application layer 110 which has been configured to handle the incoming message. The port number may be included in a field in the Transport Protocol header 113.

When the edge device on a network is a NAT box and is rewriting the originating address of the end user on an interior network device so that it appears that the message originated from the NAT box, it also keeps track of the address to which the message is sent. Any return incoming messages from that address will be stripped of the NAT box IP and MAC headers, replaced with the IP and MAC addresses of the interior device and forwarded to the originating device. Since the illustrative embodiment of the present invention encapsulates the message intended for the originating process in a higher level protocol in the message body, the encapsulated message still includes sufficient information to arrive at the virtual address of the originating process once it arrives at the interior device after being forwarded from the NAT box.

Figure 4:
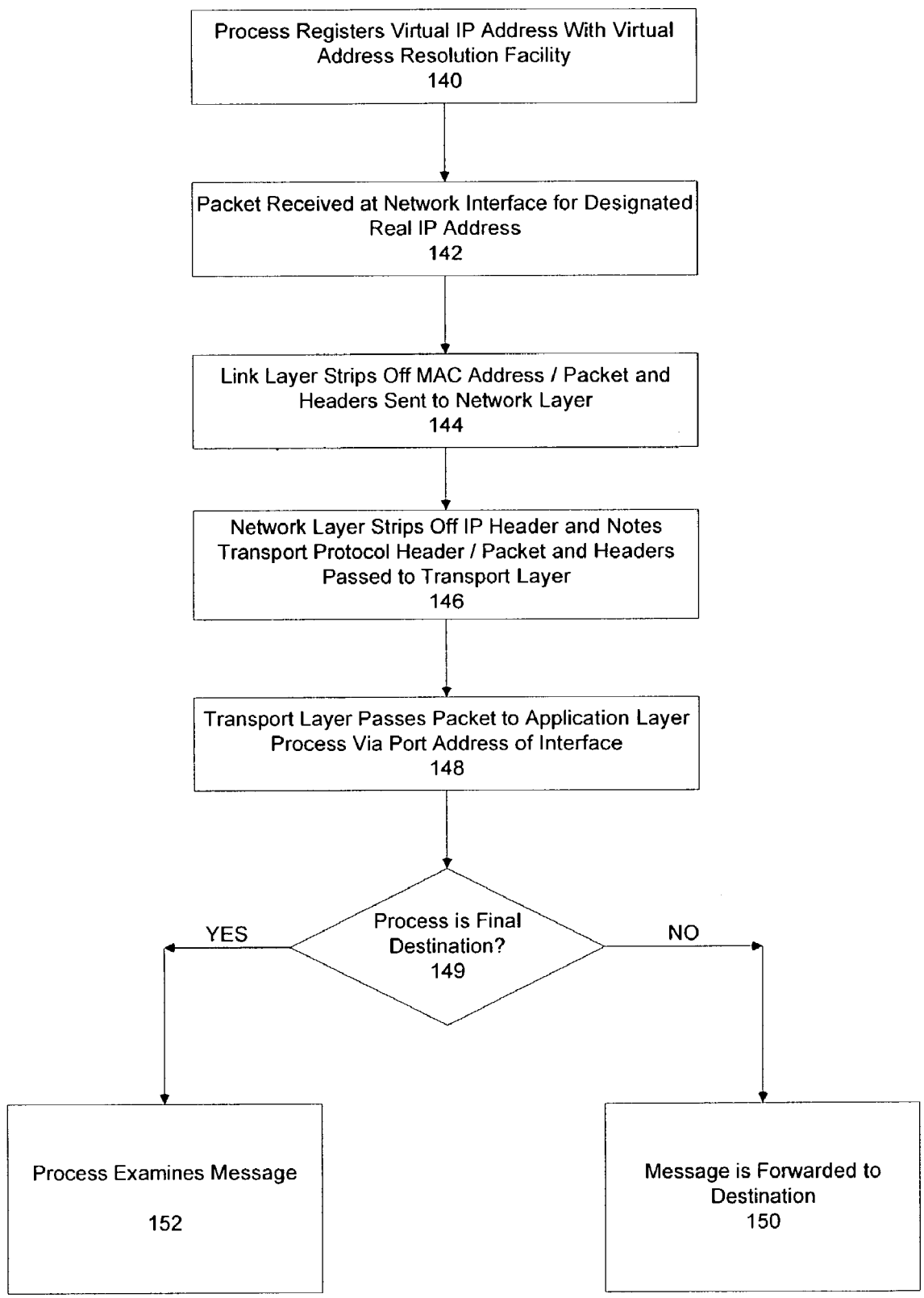
FIG. 4 is a flowchart of the sequence of steps followed by the illustrative embodiment of the present invention to send messages over a virtual network to an intended virtual destination address using data encapsulation performed with higher level protocols specified in a virtual address resolution lookup table.

FIG. 4 depicts the sequence of steps followed by the illustrative embodiment of the present invention to process the received encapsulated message. The sequence begins when a process associated with a virtual IP address registers with the virtual address resolution facility 24 (step 140). The registration is stored in a VARP lookup table accessible over the network. Subsequently, a message is received at the electronic device which bears a MAC/network interface address of the network interface of the electronic device with the designated real IP address listed in the virtual address registration (Step 142). The MAC address header 117 is stripped off at the Link layer and the message and appended headers are passed up to the Network layer 114(Step 144). The Network layer 114 strips off the IP header 115 and identifies the Transport Protocol header 113 underneath. The Network layer passes the message and remaining appended header to the Transport layer 112 (Step 146). The Transport layer 112 strips off the Transport header and then passes the message to the Application layer via the port address of the interface identified in the VARP registration. (Step 148). The receiving process determines whether it is the virtual destination address the message is addressed to (Step 149) and acts accordingly. If the receiving process that is examining the message is the destination address, the process examines the data (Step 150). Alternatively, if the message is not intended for the process executing on the edge device, the process re-routes the message and sends it back down the protocol model stack, on to the local network operating behind the edge device, and on to its intended destination by performing traditional VARP and ARP lookups. Alternatively forwarding the message may be accomplished by reinserting the packet into the IP layer of the networking stack.

The illustrative embodiment of the present invention may also be utilized to send a message from a virtual address located behind a NAT box to a destination address on the same virtual network that is behind a different NAT box. Ordinarily, where the destination address is directly connected to the Internet (i.e.: in situations where the destination is not behind a NAT box), a connection, such as a TCP connection, may be established between the originator of the connection behind the NAT box and the destination. The originator's message passes the NAT box and the internal mapping of public address and port number to internal address and port number takes place. Return packets from the destination may then be received following the mapping. When the destination address is also behind a NAT box, the originator of the message is unable to directly address the destination (since the address of the destination may not be routable in the public Internet). In such a case, the present invention adds an entry to the VARP table for a third-party reflecting agent located at an address outside the NAT box. Messages that are being sent from the originating virtual address behind a NAT box to a destination which is behind a different NAT box are sent via the reflecting agent intermediary outside the NAT box and reflected to the destination.

Figure 5:
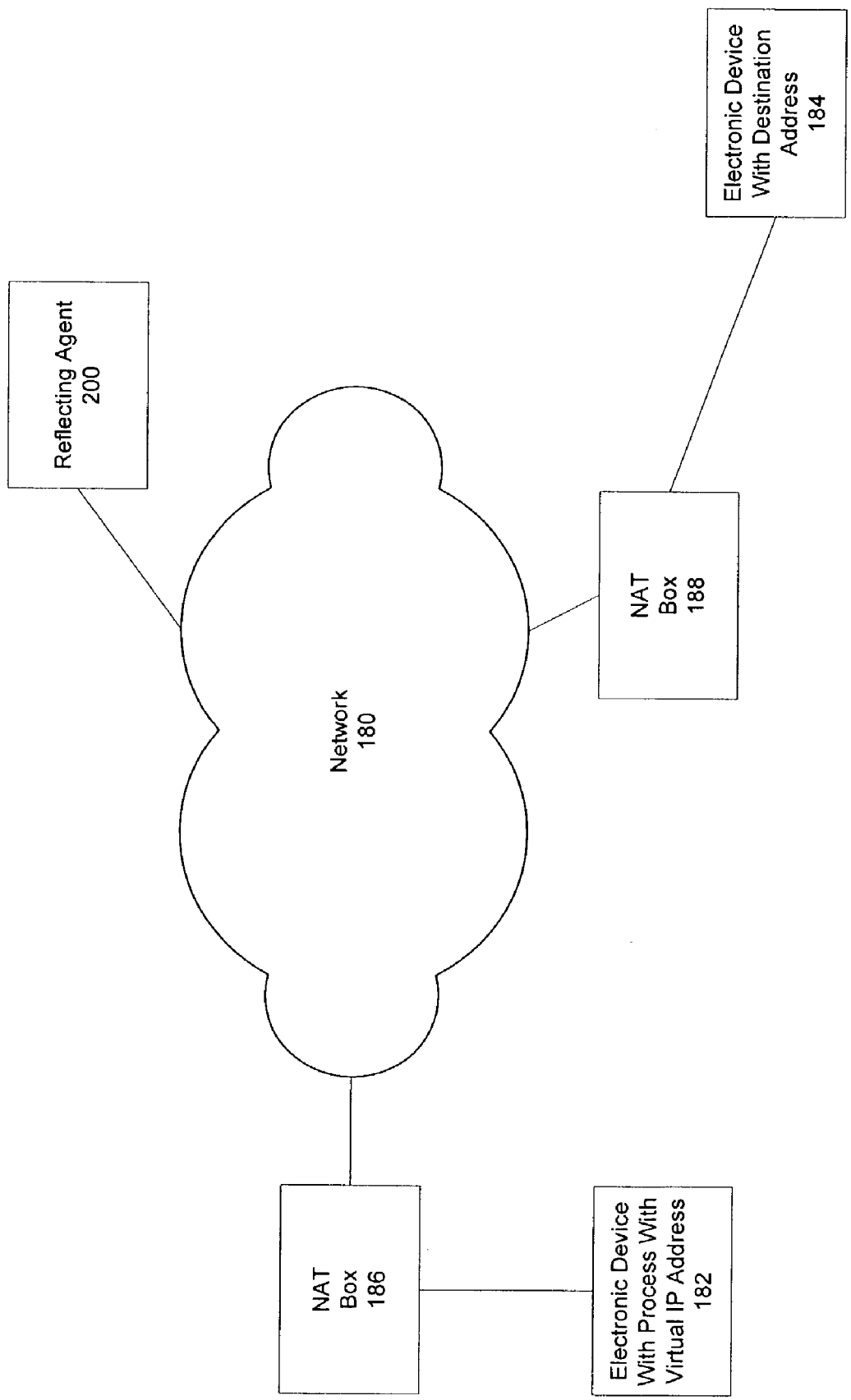
FIG. 5 is a block diagram of an environment suitable for practicing the illustrative embodiment of the present invention which includes the use of a Network Address Translation (NAT) box and a reflecting agent.

FIG. 5 depicts a block diagram of an environment holding a virtual network in which both the originator and destination of a message are located behind NAT boxes. An electronic device holding an originating process 182 which is part of a virtual network is interfaced with a network 180, such as the Internet, via a NAT box 186. An intended recipient for a message sent from the originating process 180 is an electronic device with a destination address 184 that is also behind a NAT box 188. A reflecting agent 200, the address of which has been added to a VARP table, acts as an intermediary to allow a connection between the originating process 182 and destination address 184.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Although reference has been made herein to the Internet Protocol model stack, these references have been made for illustration purposes to model the flow of data between origin and destination which occurs while executing the system and method of the present invention. Other methods of modeling the flow of data may be used to describe the present invention, such as by referring to the OSI model stack instead of the Internet Protocol model stack, without departing from the scope of the present invention. Similarly, practitioners of the art will realize that the sequence of steps and architectures depicted in the figures may be altered without departing from the scope of the present invention. For example, the present invention may be utilized in situations where there is no packet filtering device or NAT box at the edge of the network in order to ensure QOS behavior of a conection. The illustrations contained herein are singular examples of a multitude of possible depictions of the present invention, and should be considered accordingly.

We claim:

1. In a network with a virtual address resolution facility and a supported virtual network, said virtual address resolution facility used to resolve a virtual IP address into a real IP address, a method for sending messages between virtual IP addresses, comprising the steps of:
  registering a virtual address destination with said virtual address resolution facility, said registration indicating a real IP address, a port number, a transport protocol designation, and an Application layer protocol designation;
  resolving said virtual address destination using said virtual address resolution facility into a real IP address destination;
  determining a transport protocol to encapsulate a message based upon a transport protocol designation in said virtual address destination registration and to add a transport protocol header to said message;
  formatting said message to be compatible with said Application layer protocol designation in said virtual address destination registration;
  resolving said real IP address destination to determine a media access control (MAC) address destination; and
  sending said formatted message, augmented by said determined MAC address destination, said real IP address destination and said transport protocol header, from a virtual IP address to the real IP address destination indicated in said virtual address destination registration.

2. The method of claim 1, comprising the further step of: encapsulating said message in the transport protocol specified in said registration prior to sending said message.

3. The method of claim 1 wherein said virtual address destination is behind one of a firewall, NAT box, proxy server, packet filtering device, and gateway.

4. The method of claim 1 wherein a process associated with the sending virtual IP address is located on an electronic device outside a firewall and said virtual address destination is located inside the firewall.

5. The method of claim 4 wherein said virtual address resolution facility is located on a different electronic device located outside the firewall than the sending process.

6. The method of claim 1 wherein said real IP address is associated with a proxy server.

7. The method of claim 1, comprising the further step of: using secure socket layers to send said message to said virtual address destination.

8. The method of claim 1, comprising the further step of: using at least one of the User Datagram Protocol (UDP), Transmission Control Protocol (TCP) X.25, XTP, and AppleTalk to send said message to said virtual address destination.

9. In a network with a virtual address resolution facility and a supported virtual network, said virtual address resolution facility used to resolve a virtual IP address into a real IP address, a method for sending messages between virtual IP addresses, comprising the steps of:
  resolving a virtual address destination using said virtual address resolution facility into a real IP address destination, said virtual address resolution facility holding a real IP address, a port number, a transport protocol designation, and an Application layer protocol designation associated with said virtual address destination;
  determining a transport protocol to encapsulate a message based upon a transport protocol designation in said virtual address destination registration and to add a transport protocol header to said message;
  formatting said message to be compatible with said Application layer protocol designation in said virtual address destination registration;
  resolving said real IP address destination to determine a media access control (MAC) address destination; and
  sending said formatted message, augmented by said determined MAC address destination, said real IP address destination and said transport protocol header, from the virtual IP address to the real IP address destination associated with said virtual address destination.

10. The method of claim 9, comprising the further step of: encapsulating said message in the transport protocol associated with said virtual address destination prior to sending said message.

11. The method of claim 9, wherein said virtual address resolution facility also holds the address of a reflecting agent, said reflecting agent being located outside a Network Address Translation (NAT) box that both the virtual address destination and virtual address said message is originating from are located behind, comprising the further steps of: sending said message to said virtual address destination via said NAT box and said reflecting agent.

12. In a network with a virtual address resolution facility and a supported virtual network, said virtual address resolution facility used to resolve a virtual IP address into a real IP address, a non-transitory medium holding computer-executable steps for a method for sending messages between virtual IP addresses, said method comprising the steps of:
  receiving a registration request at said virtual address resolution facility, said registration request associating a virtual address destination with a real IP address, a port number, a transport protocol designation and an Application layer protocol designation;
  storing said associations with said virtual address resolution facility;
  receiving a resolution request, said resolution request including a virtual address destination;
  resolving said virtual address destination using said virtual address resolution facility and the stored associations into a real IP address destination;
  determining a transport protocol to encapsulate a message based upon a transport protocol designation in said virtual address destination registration and to add a transport protocol header to said message;
  resolving said real IP address destination to determine a media access control (MAC) address destination; and
  formatting said message to be compatible with said Application layer protocol designation in said virtual address destination registration, and augmenting said formatted message by said determined MAC address destination, said real IP address destination and said transport protocol header.

13. In a network with a virtual address resolution facility and a supported virtual network, said virtual address resolution facility used to resolve a virtual IP address into a real IP address; a non-transitory medium holding computer-executable steps for a method for sending a message from an electronic device within the virtual network to another electronic device within the virtual network, said method comprising the steps of:
  registering a virtual address destination of said another electronic device with said virtual address resolution facility, said registration indicating a real IP address, a port number, a transport protocol designation, and an Application layer designation;
  determining a transport protocol to encapsulate a message based upon a transport protocol designation in said virtual address destination registration and to add a transport protocol header to said message;
  formatting said message to be compatible with said Application layer protocol designation in said virtual address destination registration;

resolving said real IP address destination to determine a media access control (MAC) address destination; and receiving said formatted message, augmented by said determined MAC address destination, and said transport protocol header, at said real IP address indicated in said virtual address destination registration.

14. The medium of claim 13 wherein said message is encapsulated in the transport protocol designated in the registration prior to receipt of said message.

15. The medium of claim 13 wherein said real IP address is associated with a proxy server.

16. The medium of claim 13 wherein said method comprises the further steps of:

forwarding said message to a process associated with said virtual address destination.

\* \* \* \* \*